United States Patent [19]

Rumstein

[11] 3,830,951
[45] Aug. 20, 1974

[54] TRAFFIC CONTROLLER TRAINING AID
[76] Inventor: Melvin Rumstein, 47 Mackay Dr., Hauppauge, N.Y. 11787
[22] Filed: June 28, 1972
[21] Appl. No.: 267,041

[52] U.S. Cl. ................................................. 35/10.4
[51] Int. Cl. .............................................. G09b 9/00
[58] Field of Search ..................................... 35/10.4

[56] References Cited
UNITED STATES PATENTS

| | | | |
|---|---|---|---|
| 2,838,848 | 6/1958 | Bergstad et al. | 35/10.4 |
| 3,016,791 | 1/1962 | Van Inwagen | 35/10.4 UX |
| 3,146,665 | 9/1964 | Domeshek et al. | 35/10.4 X |
| 3,229,017 | 1/1966 | Snyder | 35/10.4 |
| 3,374,481 | 3/1968 | Lupinetti | 35/10.4 X |

Primary Examiner—T. H. Tubbesing
Attorney, Agent, or Firm—Hubbell, Cohen & Stiefel

[57] ABSTRACT

A training aid for assisting in the training of air traffic controllers which simulates live air traffic conditions on a simulated radar scope wherein a plurality of individually controllable multi-axis target projectors under the control of a relay control network associated with each of the projectors provide a plurality of targets each having independently variable target parameters, such as speed and amount of turn of the target. In addition, a radar simulation of environmental conditions, such as weather is provided. The focus of the movable projector as well as the proper orientation of target identification signals, such as a transponder simulation, is automatically controlled by synchros in conjuction with the relay control network associated with the projector as the simulated target moves across the screen in a line traffic simulation. The movement of the projector is controlled by a turn motor and a speed motor which determine the rate of turn of the target and the speed thereof, respectively, the motor rates being inversely proportional in the apparatus of the present invention so that the vectors in the direction of movement do not tend to increase the forward speed of the target making the turn. The simulator may be controlled either manually or via a preprogrammed tape.

12 Claims, 10 Drawing Figures

TRAFFIC CONTROLLER TRAINING AID

BACKGROUND OF THE INVENTION

1. Field of the Invention

The present invention relates to training aids and more particularly to an apparatus for simulating live air traffic conditions.

2. Description of the Prior Art

Air traffic controllers have become an essential part of our day to day transportation with the tremendous growth experienced by the aircraft industry. In performing his function, an air traffic controller monitors a screen, usually of the cathode ray tube type, on which are displayed a number of aircraft, some of which are assigned to him for control, the controller usually being assigned to a particular geographic area and a particular range of altitudes. Typically, the controller is assigned a target as a particular displayed aircraft appears on the screen and has responsibility for control of this target until it is out of his region of control. Usually, the air traffic controller has under his control more than one target at a time, an average being perhaps seven or eight and, under high density traffic conditions, this total sometimes being as many as 30 or 35 targets. During the period of time in which the air traffic controller has cognizance of a particular target, he is responsible to see that the target follows its proper flight plan and avoid situations which are potentially dangerous with respect to its position and path with respect to other aircraft in the assigned area. A significant percentage of these targets are commercial aircraft carrying passengers which have, in recent years, grown much larger, more massive and faster than in the past. The decisions made by a controller are, therefore, crucial and must be made much more rapidly than heretofore with the consequence that a great deal of pressure responsibility and tension have become a normal part of his job. Small mistakes, errors in judgment, confusion when confronted with a crowded sector can, and, in the past, have resulted in tragic consequences to a large number of air passengers and their families.

As a result of the awareness on the part of all interested parties involved directly or indirectly in the business of air traffic, much interest has centered on the training and preparation of the air traffic controller who is to be entrusted with the responsibility for the safe movement of air traffic. The complexity of the duties of an air traffic controller is evidenced by the very fact that at this stage of technology, advanced as it is, and with financial stakes as high as they are, there is no completely or even substantially fully automatic system to accomplish what he does as a trained and intelligent individual watching his sector of air traffic. It is presently only through a long period of training that the air traffic controller can be prepared for this great responsibility.

Because of the inadequacy of presently available proper training equipment capable of simulating actual live air traffic conditions, one half to two thirds of this extensive training period is spent in on the job control activities under the supervision of an experienced controller. This not only detracts from the time available by experienced controllers to carry on their air traffic control function but, in addition, as the complexity of the job increases due to the presence of more aircraft at any one time in a given sector, there is a growing danger in a training system in which the trainee has control of live traffic where rapid decisions must be made to insure the continued safety of the aircraft due to the fact that control decisions must be referred to a second person, the experienced controller, which introduces a time delay which is inconsistent with all the requirements of safety inherent in a real time situation where time is of the essence. Another disadvantage of the present form of on-the-job training, arises out of the large number of trainees who must be present at any one time to produce the needed number of air traffic controllers to meet future traffic demands and the replacement of existing experienced controllers whose active life in the field is presently of relatively short duration.

Prior art attempts have been made and are continuing to be made to overcome the great problems associated with the training of air traffic controllers. One such prior art attempt involves the design and development of a computerized display system in which air traffic can be simulated with prospective air traffic controllers spending a large number of hours obtaining experience, training and other instruction in the art of reading and controlling target traffic on a screen which is identical in every other respect to one which he would use when on the job. These prior art training systems are quite expensive however because of the relatively large number of complex factors which must simultaneously be taken into account and incorporated into what appears to be a simple display arrangement. Because of the great expense, size, and type of equipment required for such a system, the numbers of such systems are limited to less than that which is required to properly do the job, resulting in the unsatisfactory consequence that trainees must often be moved to the equipment rather than vice versa. Furthermore, with the complexities associated with such training equipment, the maintenance problems and the costs thereof are a further financial drawback. In addition, such computerized training systems which require great expenditures of money, also require a substantially long lead time, perhaps two years or more, for the system to come to fruition without any absolute assurances that such a system would be fully adequate to do the job in a rapidly evolving air traffic system when the system is completed.

An example of such a prior art system utilizing a course data computer to obtain target positions and headings is disclosed in U.S. Pat. No. 3,229,017. However, the system disclosed in this reference is directed to simulation of a radarscope presentation depicting the relative positions of two airborne aircraft to be computed along an intercept path, such as for training fighter pilots. This simulation, therefore, is not an accurate representation of that required for training an air traffic controller, such as the absence of a geographical environment, and, furthermore, does not include the display of a plurality of individually controllable movable target projections, each independently controllable by an associated relay control network to vary a plurality of associated parameters for each of the targets, such as speed, rate of turn, etc., including the capability of varying the surrounding weather.

Similarly, U.S. Pat. No. 2,633,648 discloses another prior art radar simulator training aid, this one being of the non-computer type, wherein the simulation of a simultaneous display of a stationary radar projection simulation and a single movable target projection is provided. However, once again, this prior art type of radar simulator is not sufficient for training air traffic controllers in that the simulation is not a realistic simulation of a plurality of individually movable and controllable targets appearing simultaneously on a single display screen such as provided in a realistic live traffic display of the type encountered by an air traffic controller whereon the target parameters are variable. For example, the prior art simulator disclosed in U.S. Pat. No. 2,633,648 does not enable the individual control of the speed of the target projection as well as the rate of turn which are important considerations for an air traffic controller in making proper judgments with respect to the regulation of live traffic within his zone of responsibility.

By way of example, other prior art radar simulators are disclosed in U.S. Pat. Nos. 2,505,793 and 3,018,565. However, as discussed above, these prior art simulators do not enable the individual control of a plurality of target projections wherein the parameters associated with each of the target projections, such as speed and rate of turn, may be individually controlled so as to provide a realistic live traffic simulation of the type encountered by an air traffic controller.

These disadvantages of the prior art are overcome by the present invention.

SUMMARY OF THE INVENTION

An aircraft traffic control training aid apparatus for simulating a dynamic aircraft traffic radar presentation containing a plurality of dynamic aircraft targets is provided wherein a plurality of individually controllable dynamic aircraft targets are provided in the presentation. A screen is provided for displaying the presentation thereon. Each of the plurality of aircraft targets has a plurality of associated variable parameters, such as a trajectory across the screen and speed of movement across the screen, as well as other associated parameters such as altitude indication, aircraft identification, and transponder identification code.

The apparatus includes a first projection means for projecting one of the plurality of aircraft targets on the screen, the projection means being movable about a plurality of axes relative to the screen and comprising first means for dynamically moving the first projection means about at least one of the plurality of axes for dynamically varying at least one of the plurality of associated parameters of the one aircraft target in the plural target presentation on the screen. The first moving means preferably comprises first drive means for driving the first projection means about one axis and first electromagnetic means, such as a relay control network, for controlling the operation of the first drive means in accordance with an assigned condition such as the degree of change of trajectory of the target or a change in speed of the target. The apparatus also includes at least a second projection means for independently projecting another of the plurality of aircraft targets on the screen substantially simultaneously with the projection of the one target by the first projection means, the second projection means being independently movable about a plurality of axes relative to the screen and comprising second independent means for independently dynamically moving the second projection means about at least one of the plurality of axes for independently dynamically varying at least one of the plurality of associated parameters of the other aircraft target in the plural target presentation on the screen. The second independent moving means preferably comprises second drive means for independently driving the second projection means about one axis and second electromagnetic means, such as another relay control network, for independently controlling the operation of the second drive means in accordance with an independent assigned condition, such as a different degree of change in trajectory for the other target or a different bead for the other target.

In addition, if desired any number of targets may comprise the plurality of targets in the presentation, a separate projector and drive control assembly and relay control network therefor being provided for each target so that each of the plurality of targets is dynamically individually controllable so as to provide a realistic lifelike presentation. In addition, projectors are provided for displaying a radar simulation of weather conditions, mapping, and unidentified moving traffic. Each of these projectors are preferably independently controllable and cooperate to provide a superimposed display on the screen containing this information as well as the target information in a single presentation. Preferably, the projector for the weather information includes means for obscuring at least a portion of the weather presentation on the screen for simulating a radar moving traffic indicator (MTI) condition.

A separate drive means comprising a motor is provided for controlling the speed of the target and another drive means comprising a motor is provided for controlling the turn rate or degree of trajectory change of the target. Preferably, the relay control network interrelates these drive means so as to inversely relate the driving rates thereof when the target is experiencing trajectory change in a turn so that the speed parameter associated with the target is substantially constant throughout the trajectory change or turn.

Means are provided for varying the transponder identification code simulation provided from the projector, the simulation being provided by means of an aperture through which light passes, a shutter assembly being interposable in the aperture to vary the configuration of the aperture and, thus, to vary the transponder identification code. In addition, means are provided for varying the orientation of the transponder identification code so that the code is always displayed at right angles to the origin of the simulated radar sweep.

The projection means preferably comprises a first frame member and a second frame member, with the first frame member rotatably mounted on the second frame member, and a pair of telescoping lens barrels mounted one within the other for focusing an image projected through the lens barrels to the screen, the projected image comprising the target and its associated parameters. The lens barrels are threadedly connected together, one of the lens barrels being in cooperative engagement, such as by gearing, with the second frame member. Driving means, such as for driving the projection means about one of the plurality of axes is operatively connected to the second frame member for rotating the second frame member about such axis. In this manner, as the second frame member is rotated by the drive means, the lens barrel in contact with the second frame member is telescoped (inwardly or outwardly depending on direction of movement of the second frame member) with respect to the other barrel to maintain the focus of the projected image on the screen throughout this rotation.

The associated relay control network for controlling the projection means preferably comprises a pair of sectored conductive plate members operatively connected together, each of the plate members having a rotatably mounted indicator means thereon. Each of the sectors is equivalent to a predetermined degree of trajectory variation for the target and each of the indicators is conductively connected to only one sector at a time. Means for synchronizing the plate member indicator means is also provided. One of the indicators is settable to a preselected conductor position indicative of a predetermined degree of trajectory variation or degree of turn. The other of the indicators is rotatably driven by the synchronizing means, which preferably includes a motor, to a corresponding conductive position. The second indicator means is operatively conductively connected to a relay control means for controlling the condition thereof and this relay control means is in turn operatively conductively connected to the drive means for controlling the operation thereof to drive the projection means about one of the plurality of axes in response to the rotation of the second indicator means to the corresponding position, whereby the trajectory of the target may be varied in accordance with the setting of the one indicator.

As used throughout the specification and claims, the term "initial" in referring to the various parameters associated with the targets is not meant to only include the condition of these parameters at the start of the sweep but rather is meant to also include the condition of these parameters at any time during the sweep prior to the occurrence of a change.

DETAILED DESCRIPTION OF THE PREFERRED EMBODIMENTS

Figure 1:
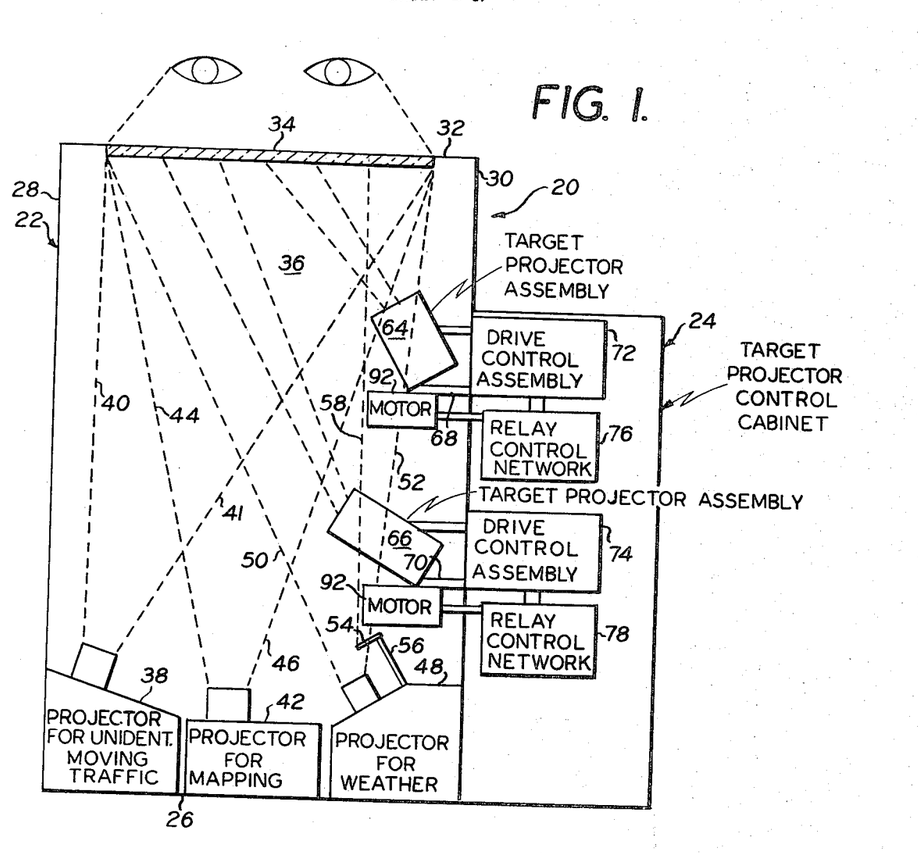
FIG. 1 is a diagrammatic illustration, partially in block, of the preferred embodiment of the present invention.

Referring now to the drawings in detail and especially to FIG. 1 thereof, a diagrammatic illustration of the preferred air traffic controller simulator or training aid, generally referred to by the reference numeral 20, is shown. The simulator 20 of the present invention preferably comprises a display housing 22 and a target projector control cabinet or housing 24. The display housing 22 preferably comprises a closed cabinet having a bottom portion 26, a first pair of opposed side portions 28 and 30 extending upwardly from the bottom portion 26, a second pair of opposed side portions (not shown) extending upwardly from the bottom portion 26 and a top portion 32 extending between the pairs of opposed side walls and running substantially parallel to the bottom portion 26 although, if desired, the top portion need not be parallel if the orientation of the various projectors, to be described in greater detail hereinafter, is altered or mirrors are provided to compensate for the variation in the plane of the top surface portion 32.

Figure 2:
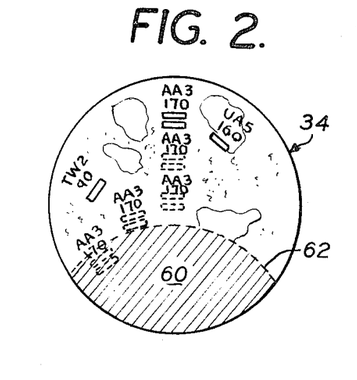
FIG. 2 is a diagrammatic illustration of a typical scope display of the embodiment shown in FIG. 1.

As shown and preferred, top surface 32 includes a display screen 34 which is preferably formed of a translucent material and is preferably circular in configuration, as shown in FIG. 2, to simulate the configuration of an actual radar display.

In addition, the top surface of the display screen 34 preferably has a luminescent coating thereon to provide an afterglow effect to simulate a "trail" effect indicative of the ground speed and direction of the target, such a conventional "trail" effect is illustrated in FIG. 2 wherein a target labeled "AA3" 170 is illustrated undergoing a 90° turn, the trail thereof being shown in phantom.

In the interior 36 of the display housing 22 a plurality of projectors, to be described in greater detail hereinafter, is preferably contained. These projectors are all preferably optically aligned with screen 34 so as to simultaneously display a plurality of images thereon representative of a "live" air traffic radar presentation. In order to accomplish such a "live" realistic presentation, the interior 36 of display housing 22 preferably includes a conventional projector 38 for projecting unidentified moving traffic on screen 34 within the field of view of projector 38 defined between lines 40 and 41 by way of example, such a simulation being provided in a conventional fashion such as by movie film. The display housing interior 36 also preferably includes a projector 42 for projecting mapping onto screen 34 from behind, such a projector 42 preferably being conventional such as a conventional slide projector. However, the information bearing slide 43 (FIG. 3) is preferably circular and is preferably rotatable as by means of a conventional motor 45 (FIG. 3) to vary the map sector being projected, only a portion or sector of the slide being projected at any given time. The field of view of this projector 42 is preferably illustrated as being contained between dotted lines 44 and 46. Another projector 48 is preferably contained within the housing interior 36 for projecting weather information onto screen 34 from behind. Preferably, this projector 48 is also a conventional slide projector.

Furthermore, it should be understood that if desired, slide projectors 42 and 48 can be of the type in which the slides containing the information thereon can be easily changed in conventional fashion so as to alter the display. The field of view of projector 48 is preferably defined between dotted lines 50 and 52. The weather projector 48 also preferably includes an adjustable disc member 54 mounted in conventional fashion on a rod 56 for fully or partially blocking the projection of weather from projector 48 by fully or partially obscuring the lens thereof so as to simulate MTI (moving target indicator) which conventionally wipes out only weather and clutter moving below predetermined speeds at predetermined variable radial distances from the origin, all other information being displayed. This provides a much more realistic air traffic display. By way of example, the disc 54 which is preferably opaque and is utilized to simulate MTI is shown partially obscuring or blocking out the weather information provided by projector 48, the unobscured weather information being defined between dotted lines 50 and 58 and the blocked out information being defined between dotted lines 58 and 52, respectively. The results of this partial obstruction are illustratively shown in FIG. 2 by zone 60 defined by the arc line 62.

As in a realistic live air traffic display, objects above this MTI maximum speed are still visible as the mapping and weather conditions, this information being simulated by projectors 38, 42 and 48, respectively, and the target projectors to be described in greater detail hereinafter and illustratively shown in FIG. 3.

It should be noted, that if desired, the mapping display 42 and the weather display 48 may be constantly changing by utilizing movie projectors in place of slide projectors for projectors 42 and 48, respectively. The mapping projection from projector 42 preferably is a typical radar view of a particular area and contains airway, VOR (VHF omnidirectional range) and holding pattern symbols which are conventionally representative to an air traffic controller of a particular traffic sector.

In addition, if desired, a rotatable circular mask (not shown) which is progressively darkened may be concentrically mounted above the circular slide and be coextensive therewith to simulate a sweep as the mask rotates at a sweep rate such as six revolutions per minute.

The interior of the housing 36 also preferably includes a plurality of individually controllable projectors for projecting moving identified target information onto screen 34 from behind, two such target projector assemblies 64 and 66 being shown by way of example and not by way of limitation. Preferably, each of the target projector assemblies 64 and 66 are identical in structure although displaying different target information representative of different targets or aircraft on display screen 34. The field of view of the target projector assemblies 64 and 66 are preferably defined as being relatively narrow, being substantially a small area on the screen 34 of sufficient size only to contain a transponder identification code simulation representing the target of the type which would appear in a conventional radar display, and descriptive information relative to the target which would also appear in a conventional radar display.

As will be described in greater detail hereinafter, each of the targets may have the parameters thereof individually varied, such as the speed of the target and the rate of turn of the target, by means of multi-axis movement of projector assemblies 64 and 66 which preferably each include multi-axis target projectors to be described in greater detail hereinafter with reference to FIGS. 3 through 10. In addition, as will be described in greater detail hereinafter, various other parameters, such as the target transponder identification code, may be readily varied by means contained within the target projector assemblies 64 and 66. The target projector assemblies 64 and 66, which will be described in greater detail hereinafter, are preferably mounted to one side wall 30 of display housing 22 by means of conventional brackets 68 and 70, respectively.

The target projector control housing 24, as shown and preferred, is adjacent display housing 22 and contains the individual drive control assemblies 72 and 74 for projector assemblies 64 and 66, respectively, and the individual relay control networks 76 and 78 for projector assemblies 64 and 66, respectively, relay control network 76 controlling drive control assembly 72 for projector assembly 64 and relay control network 78 controlling drive control assembly 74 for projector assembly 66.

Figures 3, 5, 7:
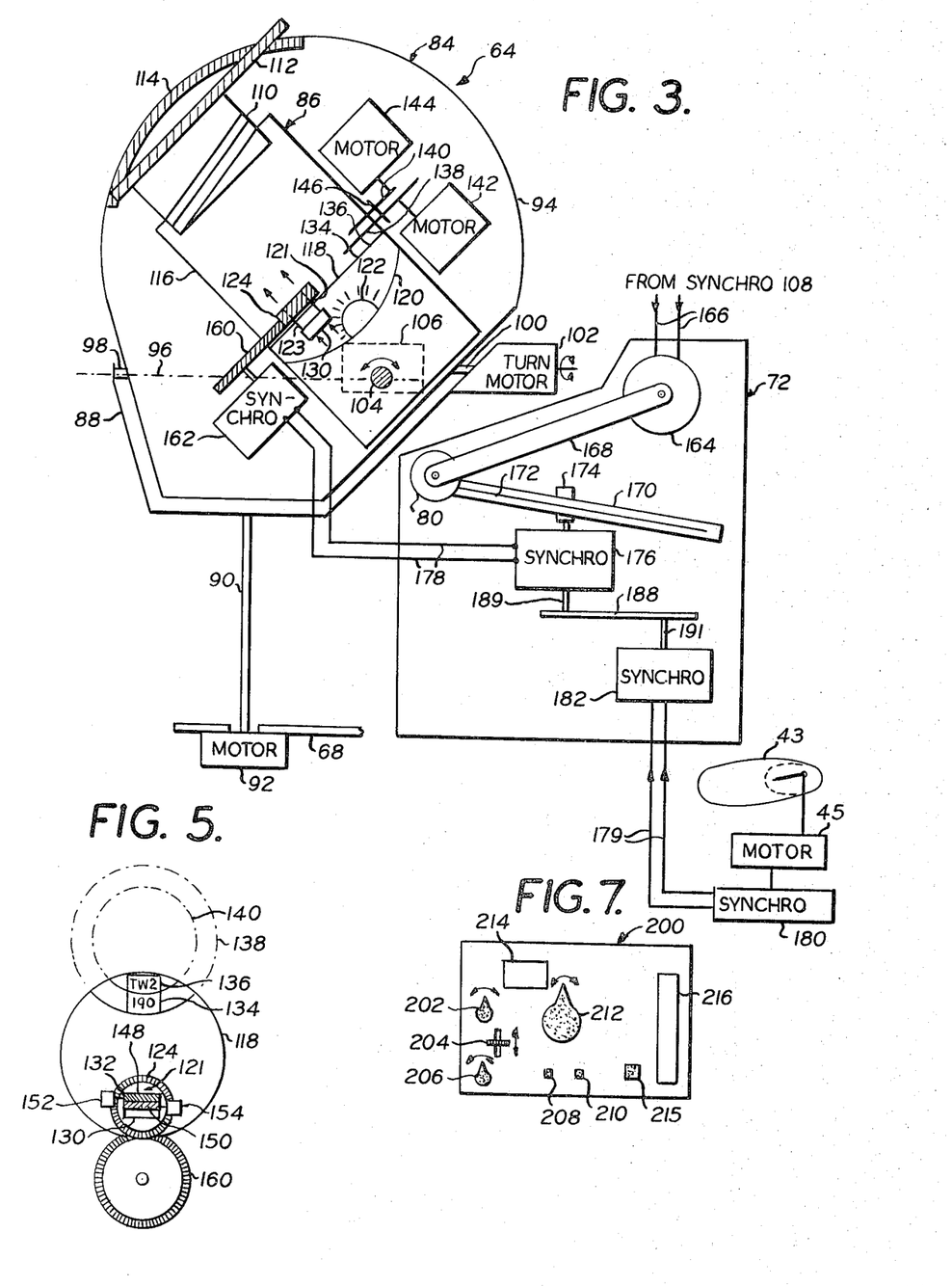
FIG. 3 is a diagrammatic illustration of the preferred embodiment of a typical projector assembly forming part of the embodiment shown in FIG. 1.
FIG. 5 is an enlarged fragmentary plan view of a portion of the embodiment shown in FIG. 3.
FIG. 7 is a plan view of a typical control panel for a typical one of the target projectors in the embodiment shown in FIG. 1.

Referring now to FIG. 3, a typical target projector assembly 64 together with the drive control assembly 72 therefor shall be described in greater detail hereinafter, these assemblies 64 and 72 preferably being identical in structure and function with assemblies 66 and 74 as previously mentioned, which assemblies 66 and 74 will not, therefore, be described in any greater detail. First describing the typical target projector assembly 64, it preferably includes a projector housing 84 which is gimballed in conventional fashion for movement (shown in greater detail in FIG. 4) to permit a target projector 86 to be described in greater detail hereinafter, to rotate about a plurality of axes so as to cover any portion of the screen 34 thus realistically simulating the varied movements of conventional aircraft targets on a display screen. The gimballing arrangement preferably comprises an outer U-shaped gimbal 88 supported for horizontal rotation on a substantially vertically extending shaft 90 which, as will be described in greater detail hereinafter, is preferably under the controlled movement of a conventional motor 92 which is preferably secured to mounting bracket 68, the shaft 90 extending therethrough and being connected to the rotor of motor 92 so as to be rotated thereby about the vertically extending axis of the shaft 90. Motor 92 provides the initial course line for the target projector 64.

As shown and preferred in FIG. 3, an inner gimbal 94 (FIG. 4) is mounted within and on outer U-shaped gimbal 88 for purposes of turn axis rotation about a horizontal turn axis 96 passing through a pair of shafts 98 and 100 which rotatably mount gimbal 94 to gimbal 88. Preferably, mounting shaft 100 is connected to and driven by a turn motor 102 which is a conventional motor which controls the turn or trajectory change parameter of the target and which selectively and controllably rotates gimbal 94 about horizontal axis 96. As shown and preferred in FIG. 3 and particularly in FIG. 4, a rotatable shaft 104 is mounted on and passes through the inner gimbal 94 (FIG. 4) which preferably surrounds the projector 86 and forms the frame for the projection 86, shaft 104 being preferably connected on one side to a speed motor 106, which is a conventional motor which controls the speed parameter of the target, and on the other side being rotatably mounted to frame or gimbal 94 and continuing therethrough to a conventional synchro 108 to be described in greater detail hereinafter whose setting is controlled by speed motor 106 and which, in turn, electrically controls the setting of the drive control assembly 72 and, thus, the orientation of the transponder identification code in a manner to be described in greater detail hereinafter.

The projector 86 preferably comprises a conventional lens barrel 110 which, as shown and preferred, supports a gear 112 having teeth thereon which are in cooperative engagement with a segment gear 114 along a portion of the periphery of gimbal 94. The lens barrel 110 is mounted in conventional fashion in a telescoping arrangement within a projector barrel 116. The projector barrel 116 preferably includes an image plate 118 having a target image thereon which plate 118 is illuminated from behind by a conventional reflector 120 light source 122 arrangement, light source 122 preferably being a conventional projector lamp. The gear arrangement 112–114 of the projector assembly 64 is to preferably alter the focus of the projected image as the projector housing 84 is rotated so as to maintain proper focus on the display screen 34 for the image during such rotation.

Figure 4:
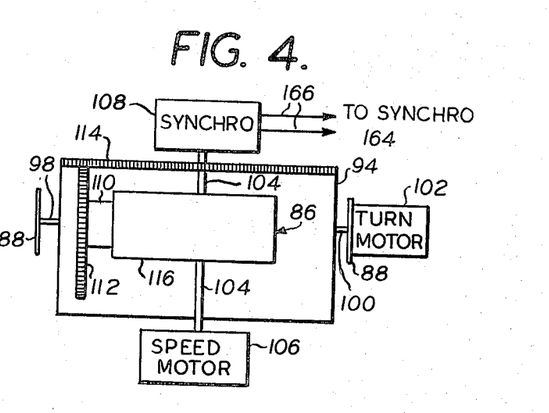
FIG. 4 is a plan view, partially in block, of the embodiment shown in FIG. 3.

Now referring to FIG. 5 in conjunction with FIGS. 3 and 4, as shown and preferred, the image plate 118 is preferably a solid disc having an aperture 121 therein. A hollow shaft 123 is preferably mounted through the aperture 121 in plate 118. A conventional rotatable gear 124 is mounted for rotation on shaft 123, the gear 124 being hollow through to shaft 123 so as to permit a projection to pass therethrough. For purposes of explanation, we shall term image plate 118 the secondary image plate. The primary target image plate, for purposes of explanation, shall be defined as the image plate which provides the transponder identification code information.

This plate is represented by assembly 130 contained below aperture 121 at the opposite end of hollow shaft 123. The plate 130 preferably contains a slot 132 therein whose full width, as will be described in greater detail hereinafter, is preferably representative of a transponder ident display. The hollow slot 132 is mounted in communication with the interior of hollow shaft 123 so as to be visible therethrough and is mounted preferably for simultaneous rotation with the plate 130 and, thus, with gear 124 so as to rotate the transponder identification code simulation. The secondary image plate 118 also preferably includes a second pair of openings 134 and 136 therein which are preferably utilized to permit light to pass therethrough to display secondary information such as altitude, identification, etc., which are contained preferably on concentrically mounted discs 138 and 140, respectively, which are mounted above the slots in image plate 118 and are preferably arranged so as to produce images which are offset from each other, the radius of disc 138 being greater than the radius of disc 140 with the information being contained at the outermost portions thereof in order to accomplish this, by way of example. The information in preferably contained at only one point on the discs 138 or 140 so the discs may be rotated out of position by means of individual control motors 142 and 144, respectively, if it is desired not to display this information or, if it is desired, to display a different information display, the discs 138 and 140 preferably containing a plurality of different information arrangements including a blank position in which no information is displayed.

As shown and preferred, these discs 138 and 140 are preferably mounted on a concentric shaft 146 supported on the outside of the projector 86, the motors 142 and 144 being conventional motors utilized to rotate these discs 138 and 140, respectively, independently of each other. As was previously mentioned, preferably discs 138 and 140 are opaque and contain printed transparent information thereon which when properly oriented over the corresponding display openings 134 and 136 display such information on the screen 34 adjacent the target projection. By way of example, disc 140 could show identification information and disc 138 could show altitude information.

Figures 6A, 6B, 6C, 8:
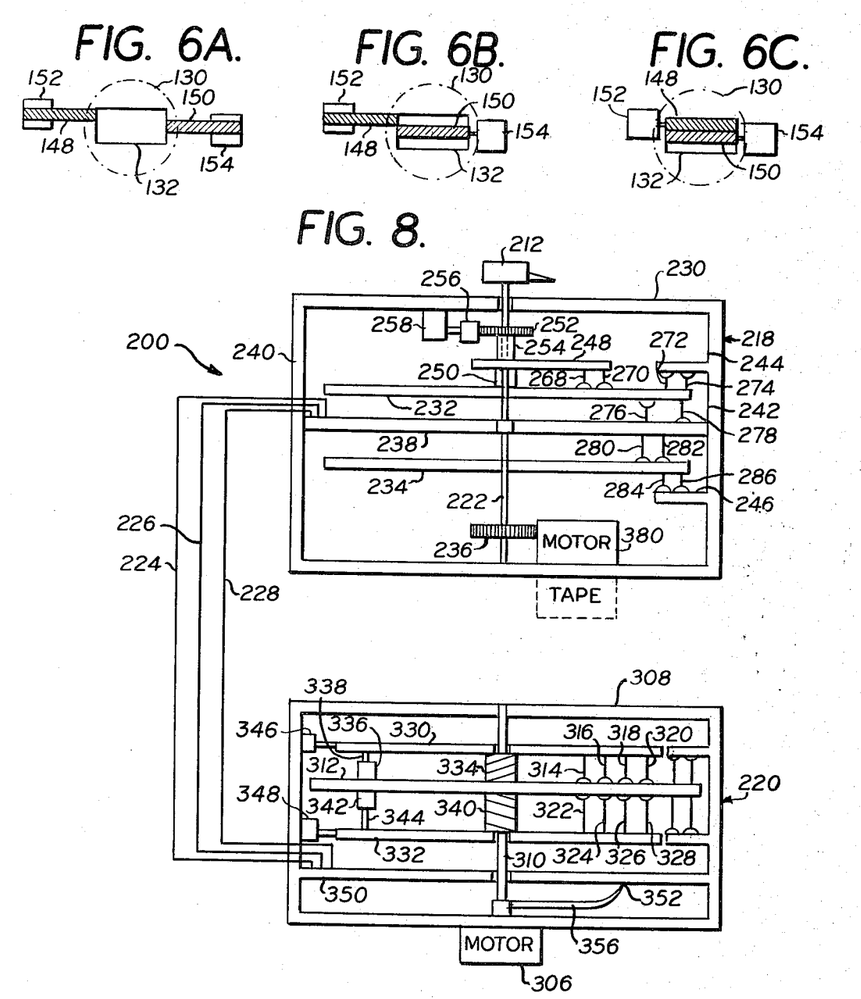
FIGS. 6A, 6B and 6C are enlarged fragmentary views of a portion of the embodiment shown in FIG. 5 illustrating different arrangements of transponder displays.
FIG. 8 is a front elevation of the relay housing arrangement of the embodiment illustrated in FIG. 7.

Referring once again to the transponder identification code disc arrangement 130, the opening 132 or slot which provides the transponder identification code configuration in conjunction with the light passing therethrough, preferably includes means for varying the type of transponder identification code display, these means comprising shutters 148 and 150 which are controlled by means of solenoids 152 and 154, respectively. The shutters 148 and 150 are preferably mounted directly on disc 130 so as to permit the target transponder identification code to be perceived as a single thin slash (FIG. 6C) when both shutters 148 and 150 are in position to partially obscure the slot 132 so as to be representative of a non-select transponder code display; a double slash when only lower shutter 150 is in position with upper shutter 148 being withdrawn, shutter 150 preferably dividing slot 132 into two equal portions so as to simulate a normal two bar transponder identification code display (FIG. 6B) or a solid bar of light with both shutters 148 and 150 withdrawn so that slot 132 is unobscured so as to simulate a transponder ident code display. The operation of solenoids 152 and 154 to move these shutters into and out of position is conventional and will not be described in greater detail hereinafter.

Now referring once again to FIG. 3 and describing the drive control assembly 72 so as to insure that the transponder identification code slash is always at right angles to the origin of the sweep to provide a realistic display as the target moves across the screen and as the target changes direction, drive control assembly 72 controlling the rotation of gear 124 to which image plate 130 is secured by means of hollow shaft 123. Gear 124 is in cooperative engagement with a drive gear 160 which is rotatably mounted to a conventional synchro 162 to be driven thereby in accordance with the rotation of synchro 162 which is controlled by drive control assembly 72 in a manner to be described in greater detail hereinafter.

The drive control assembly 72 is preferably contained in a separate target projector control housing 24, as was previously mentioned, although, if desired, both the display housing and the taget projector control housing could comprise a single housing instead of two separage housings.

A universal joint 80 is operatively connected to a conventional synchro 164 whose setting is electrically controlled by synchro 108 to which it is electrically connected via path 166 to be in synchronism therewith so that the rotation of synchro 164 matches the rotation of synchro 108. A shaft 168 which operatively mechanically links universal joint 80 and synchro 164, as will be described in greater detail hereinafter, preferably functions primarily as a reciprocating engine for 90° of rotation, of synchro 164 whose rotor the shaft 168 is connected to for rotation thereby. A slotted bar 170 is also operatively connected to universal joint 80 so as to longitudinally reciprocate as rotating synchro 164 causes movement of shaft 168 through 90° of rotation in a conventional manner similar to that of a reciprocating engine. Slotted bar 170 contains a longitudinal slot 172 in which is slidably mounted a guide plate 174.

Guide plate or slide 174 preferably longitudinally moves in reciprocating fashion in slot 172. The slide 174 is preferably connected to the rotor of another conventional synchro 176, the rotor rotating preferably as slide 174 moves due to the movement of slotted bar 170. The rotation of the rotor which is operatively connected to slide 174 in conventional fashion for converting this linear movement into a rotational movement causes generation of an electrical signal from synchro 176 which is preferably electrically connected to synchro 162 via path 178 so as to provide a drive signal to synchro 162 for controlling the rotation thereof in synchronism with the rotation of synchro 176. Preferably, the rotation of synchro 162, thus, matches the rotation of synchro 176, synchro 162 being utilized to turn the target plate gear 160 which, in turn, causes disc plate 130 to rotate via gear 124.

Another conventional synchro 182 contained in drive control assembly 72 is preferably electrically connected via path 179 to another conventional synchro 180 which is contained in projector housing 42 to be driven thereby. Synchro 180 is in turn mechanically connected to motor 45 to match the rotation thereof to orient the drive control assembly 72 to provide the initial angular displacement of the target relative to the sweep center. Synchro 176 is preferably rigidly attached to control arm 188 via its rotor shaft 189 which is, in turn, preferably connected to and driven by synchro 182 via its rotor shaft 191. Motor 92 determines the angular orientation of the sweep center to the center of the screen in projector 86 as was previously mentioned. Synchro 182 is driven by synchro 180 and in turn rotates arm 188 which then rotates synchro 176 to an analogous position, synchro 176 thereby controlling the rotation of synchro 162.

In addition, as was previously mentioned, the rotation of synchro 164 and the corresponding reciprocating movement of slotted bar 170 and guide plate 174 also drives synchro 176 to provide a signal to synchro 162 to cause the rotation of target plate gear 160 and subsequently disc 130 so as to orient the transponder identification code slash produced by the assembly associated with disc 130 so as to always be at right angles to the origin of the sweep to present a more realistic radar presentation.

Thus, summarizing the operation of the drive control assembly 72, speed motor 106 controls the setting of synchro 108 which, in turn, electrically controls the setting of synchro 164 to match the rotation of synchro 108. Synchro 164, through the reciprocating movement of slotted bar 170 provides a signal to synchro 176 which in turn controls the setting of synchro 162 which matches the rotation of synchro 176. Synchro 176 is also controlled by synchro 182 which is, in turn, controlled by synchro 180.

Thus, the projector assembly of the present invention provides both for base line orientation for the start of sweep and compensates for the movement of the target projector assembly from this initial base line as the target's direction is changed on the screen so as to orient the transponder identification code slash representative of the target so that is is always at right angles to the origin of the sweep.

Now referring to FIGS. 7, 8, 9 and 10 describing the typical relay control network, such as network 76, for controlling the multi-axis movement of target projector assembly 64 and, thus, the movement of the transponder identification code target across the screen 34 as well as other parameters associated with the target such as speed and rate of turn. Preferably, relay control network 78 is identical with relay control network 76 and will not be described in greater detail hereinafter.

Referring initially to FIG. 7, a typical relay network control panel configuration is illustratively shown. The control panel 200 and, corresponding relay control network 76, enables independent control of the associated target projector assembly 64 and, thus, of the target displayed on the screen 34, relay control network 78 and its control panel independently controlling target projector assembly 66 and its associated target. Relay control network panel 200 preferably contains on its face a speed selector dial 202, a switch 204 for altering the altitude display of the target by activating motor 142 to cause rotation of altitude display disc 138, a dial 206, such as a rheostat, for selecting the rate of altitude change by changing the speed of motor 142 and thus, the speed of rotation of altitude display disc 138, a transponder code selector comprising switches 208 and 210, switch 208 controlling the operation of solenoid 152 and switch 210 controlling the operation of solenoid 154 to select the code configuration by selecting the position of shutters 148 and 150, respectively; a turn dial 212 to select the direction of movement of the target, turn dial 212 controlling turn motor 102 such as via a rheostat and speed selector dial 202 controlling speed motor 106 such as via a rheostat, a display window 214 for viewing the identity of the target corresponding to that displayed by disc 140, an emergency turn rate selector switch 215 and, if desired, a slot 216 for receiving a preprogrammed tape for controlling the operation of the various switches and dials associated with the relay control network if automatic operation is desired. Such a tape could be utilized to control the route or path "flown" by the target on the screen. If desired, the tape could track synchro 164 so that if the route of the target is manually changed from the preprogrammed route, then the tape will be overridden until such time as the target is manually returned to the preprogrammed route.

Referring now to FIG. 8, panel 200 preferably includes an upper housing portion 218 and a lower housing portion 220. Turn dial 212 is preferably mounted on upper housing portion 218 via a shaft 222. Upper housing 218 is termed the director control whereas lower housing 220 is termed the follower control, director control 218 being preferably electrically connected to follower control 220 via electrical paths 224, 226 and 228. Director control 218 preferably comprises a housing 230 preferably made from an electrical insulating material. Shaft 222 is preferably rotatably mounted in housing 230 for simultaneous rotation with turn dial 212. In addition, a pair of spaced apart discs 232 and 234 and a conventional gear 236, whose purpose will be described in greater detail hereinafter, are mounted on shaft 222 for simultaneous rotation therewith. A stationary disc 238 is preferably connected to and supported from side walls 240 and 242 of housing 230 in conventional fashion.

As will be described in greater detail hereinafter, as shown and preferred, a pair of outwardly extending arms 244 and 246 extend outwardly from side wall 242 and are preferably vertically spaced apart above and below discs 232 and 234, respectively, being preferably closely adjacent thereto so that electrical contact may be established between arm 244 and disc 232 and arm 246 and disc 234 in a manner to be described in greater detail hereinafter. As will also be described in greater detail hereinafter, arms 244 and 246 and stationary disc 238 preferably make electrical contacts through the rotating discs 232 and 234.

A rotatable arm 248 is preferably also mounted on shaft 222 above disc 232 and is separated therefrom by a conventional insulator spacer member 250. A gear 252 is preferably mounted for simultaneous rotation with arm 248 and is rigidly connected thereto through an outer annular shaft 254, shaft 222 passing through the interior of annular shaft 254. A conventional stop member 256 which is actuated by a conventional solenoid 258 preferably serves to hold gear 252 and arm 248 in its existing angular position on shaft 222 and disc 232. As illustratively shown in FIG. 8, solenoid 258 is in the de-energized condition and thus stop member 256 bears against gear 252 to lock it against rotation.

Figure 9:
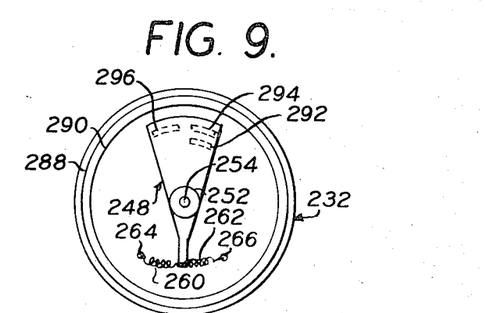
FIG. 9 is a plan view, partially in schematic, of a portion of the embodiment illustrated in FIG. 8.

Referring at this point to FIG. 9, as shown and preferred, a pair of resilient springs 260 and 262 are connected at one of their respective end points to points 264 and 266, respectively, located on disc 232 and at their respective other end points are connected to arm 248. Accordingly, when solenoid 258 is actuated, stop member 256 is retracted which thereby unlocks gear 252 and arm 248 enabling arm 248 to swing with respect to disc 232 so as to balance the resilient forces exerted by springs 260 and 262. By way of example, if turn dial 212 is rotated while arm 248 is locked in position due to stop member 256, as illustratively shown in FIG. 8, the rotation of shaft 222 and disc 232 mounted thereon for simultaneous rotation therewith causes springs 260 and 262 to be loaded due to the rotational movement of disc 232 with respect to the locked arm 248. In this instance, when solenoid 258 is actuated to withdraw stop member 256 and, thus, unlock arm 248, the arm 248 will follow the movement previously made by disc 232 to balance the forces of the loaded springs and thus unload the springs 260 and 262.

As shown and preferred in FIGS. 8 and 9, a plurality of electrical contact fingers interconnect the various discs contained within the director housing 230 in order to enable control over speed motor 106 and turn motor 102 in a manner to be described in greater detail hereinafter. Arm 248 and rotatable discs 232 and 234 are preferably provided with circular conductive track segments to be selectively engaged and disengaged by a plurality of the metal contact fingers to be described hereinafter. Disc 232 is provided with a pair of upstanding electrical contact fingers 268 and 270, respectively, whose free ends come in contact with the bottom surface of the arm 248 as illustrated in FIG. 8. Arm 244 is preferably provided with another pair of electrical contact fingers 272 and 274 whose free ends come in contact with the upper surface of disc 232 preferably. The bottom surface of disc 232 preferably supports an electrical contact finger 276 whose free end touches stationary disc 238 and stationary disc 238 preferably supports a contact finger 278 whose free end touches the bottom surface of disc 232. Similarly, disc 234 preferably carries a pair of electrical contact fingers 280 and 282 whose free ends contact the bottom surface of stationary disc 238 and arm 246 preferably supports a pair of contact fingers 284 and 286 whose free ends contact the bottom surface of disc 234.

Disc 232 is preferably provided on its upper surface with a pair of circular conductive bands 288 and 290 (FIG. 9) aligned with and for continuous contact with contact fingers 272 and 274, respectively, extending from arm 244. Band 288 is preferably electrically connected to contact finger 272 (not shown) in conventional fashion and band 290 is preferably electrically connected to contact finger 274 in conventional fashion (not shown).

As shown and preferred in FIG. 9, a pair of annularly arranged conductive circular segments 292 and 294 which are radially spaced apart and which preferably are engaged by contact fingers 268 and 270, respectively, are contained on the bottom surface of arm 248. In addition, another conductive circular segment 296 is also preferably contained on the bottom surface of arm 248 and is preferably circumferentially aligned with outer conductive segment 294, conductive segments 294 and 296 controlling the on/off relay of the relay control network in a manner to be described in greater detail hereinafter and conductive segment 292 controlling the right/left relay of the relay control network to be described in greater detail hereinafter.

Figure 10:
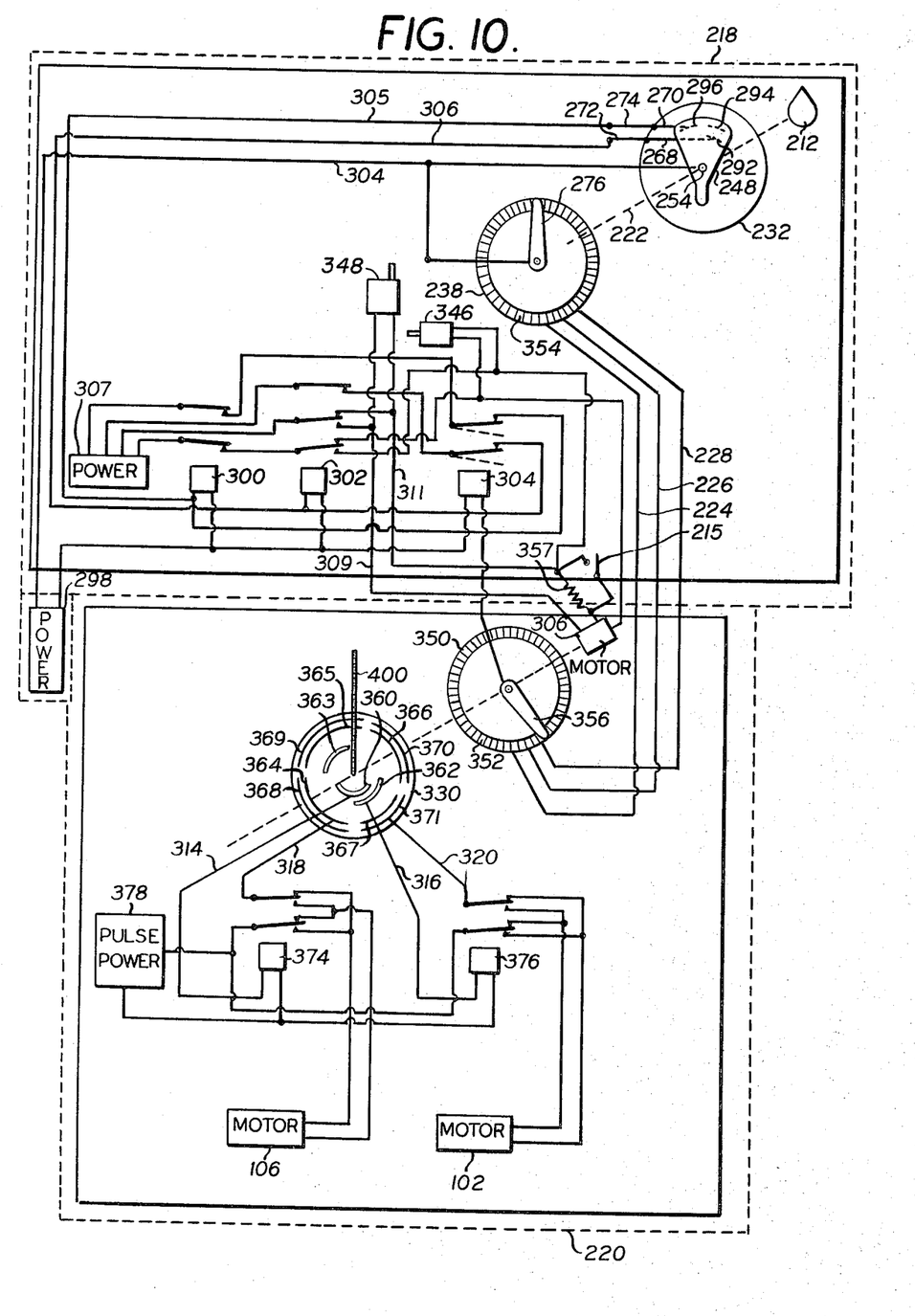
FIG. 10 is a schematic diagram, partially in block, of a typical relay control network for controlling a typical one of the target projectors in the embodiment shown in FIG. 1.

As shown and preferred in FIG. 10, each of these conductive segments 292, 294 and 296 is provided with electrical power from a conventional power source 298 via path 304 so that when contact fingers 268 and 270 are in contact with segments 292 and 294, respectively, power is supplied to conventional relays 300 and 302, respectively, via electrical path 304 and electrical paths 305 and 306, respectively, to activate the appropriate relays. As shown and preferred in FIG. 10, conventional relay 300 has one set of contacts and is the on/off control relay and conventional relay 302 preferably has two sets of contacts, relay 302 being the left/right control relay. Both relay 300 and relay 302 are operatively connected, through another conventional relay 304 known as the cut off relay which turns off control relays 300 and 302 when activated. Relays 300, 302 and 304 control the operation of a conventional motor 306 which determines the degree of turn of the target in a manner to be described in greater detail hereinafter, relay 302 having two sets of contacts wherein the second set is for the purpose of shifting the EMF from one side of motor 306 to the other side thereby determining the direction of rotation of motor 306. Conventional power source 307 which supplies power to motor 306 is electrically operatively connected to motor 306 through relays 300, 302 and 304 via paths 309 and 311. Accordingly, with both fingers 268 and 270 in contact with their respective segments 292 and 294, both relays 300 and 302 are activated, power is supplied to motor 306 from source 307 and motor 306 turns in one direction, for example, the left turn direction. When finger 270 is in contact with segment 296 instead of segment 294, relay 302 is not actuated, the applied polarity of source 307 is reversed and motor 306 is driven in the opposite direction, for example, the right turn direction.

In the normal balanced condition for arm 248, arm 248 is locked in the neutral position, with respect to springs 260 and 262, by means of stop member 256. In this condition, contact fingers 268 and 270 rest along radii between segment 296 on one side and segments 292 on the other side. Thus, when turn dial 212 is rotated to change the direction in which the target is moving across the screen 34, disc 232 containing contact fingers 268 and 270 which are supported thereon is simultaneously moved so that contact is made with either band 296 or bands 292 and 294 by contact fingers 268 and 270. When this contact is established, the appropriate relays 300, 302 and 304 are activated and motor 306 is driven in the direction, right or left, selected by the direction of rotation of turn dial 212. Solenoid 258 is actuated by relay 300 which is energized in either direction so that as soon as contact with segments 296 or 292 and 294 is made, arm 248 is unlocked and returned to the normal position by the action of springs 260 and 262 in the manner previously discussed.

As previously mentioned, relays 300 and 302 are latch relays so that once having been actuated they remain so, even after arm 248 returns to its neutral position, until these relays are unlatched.

The follower control portion 220 consists of a housing 308 upon which is supported motor 306, motor 306 being connected, preferably, rigidly to a rotatable shaft 310 for simultaneous rotation therewith. A rotatable disc 312 is preferably mounted on shaft 310 for simultaneous rotation therewith, a plurality of contact fingers 314, 316, 318 and 320 being supported on the upper surface of disc 312 and another plurality of contact fingers 322, 324, 326 and 328 being supported on the bottom surface of disc 312. The right turn disc 330 is preferably spaced from and supported above disc 312 and a left turn disc 332 is preferably spaced from and supported below disc 312, both the right turn disc 330 and the left turn disc 332 being rotatably mounted so as to be rotatable with respect to shaft 310 in a restricted manner to be described in greater detail hereinafter. Right turn disc 330 is preferably connected to disc 312 through a coiled spring 334 which allows disc 330 to rotate clockwise (in the right hand direction) with respect to disc 312 against spring 334. Rotation of disc 330 in the opposite direction is preferably prevented by a stop member 336 mounted on disc 312 and a stop element 338 downwardly extending from disc 330 so as to engage stop member 336 in the stop position. Similarly, left hand disc 332 is connected to disc 312 through another coil spring 340 which permits disc 332 to rotate counterclockwise (in the left hand direction) with respect to disc 312 against spring 340. Rotation of disc 332 in the opposite direction is prevented by a stop member 342 located on disc 312 and an upwardly extending arm 344 located on disc 332 so as to engage stop member 342 in a stop position. In this manner, rotation of disc 312 on shaft 310 by means of motor 306 would normally carry right turn and left turn discs 330 and 332, respectively, along therewith.

A pair of conventional solenoids 346 and 348 are mounted on housing 308. In addition, a stationary disc 350, to be described in greater detail hereinafter, is mounted within and supported on housing 308 in conventional fashion. When solenoids 346 and 348 are de-energized, as illustrated in FIG. 8, they hold discs 330 and 332 against rotation due to their respective shafts engaging with suitable teeth (not shown) on the surfaces of discs 330 and 332. Solenoids 346 and 348 are energized alternatively by one or the other of the leads from relay 302 to motor 306. Hence, when motor 306 is energized for a left turn, with for example shaft 310 rotated in a clockwise direction, solenoid 346 is energized releasing disc 330 so that as disc 312 rotates clockwise, disc 330 is carried therewith. Disc 332, however, remains restrained against rotation by solenoid 348 so that there is relative rotation between discs 312 and 332.

Correspondingly, for a right turn, with motor 306 rotating in the opposite direction, the opposite effect is produced with solenoid 348 being energized and releasing disc 332 so that as disc 312 rotates counter-clockwise, it carries disc 332 with it, disc 330, in this instance, remaining restrained against rotation by solenoid 348 so that there is relative rotation between disc 312 and disc 330.

Stationary disc 350 within follower control 220, contains a conductive band 352 on the lower surface thereof, conductor band 352 being divided into a large number of conductive sequential segments closely separated from each other as illustrated in FIG. 10, disc 350 preferably being a conductor sectored plate having individual conductor segments, such as copper, such as preferably 36 segments wherein one segment equals 10° of rotation. Stationary disc 238 in director 218 is preferably similarly divided and is a conductor sectored plate having individual conductor segments such as copper, contained in a segmented conductive band 354 having an equal number of segments, preferably, with sectored band 352, the corresponding segments of band 354 and 352 being preferably electrically connected together, only three such connections 224, 226 and 228 being shown by way of example, the balance of the connections being omitted for purposes of clarity. Thus, segmented band 354 also preferably contains 36 segments, one segment being equivalent to 10° of rotation. As shown and preferred in FIG. 10, segmented conductive band 354 is preferably contacted by a rotatable contact finger 276. Furthermore, a contact finger 356 is mounted on shaft 310 and extends therefrom having its free end in contact with the segmented conductive band 352. The other end of contact finger 356 is electrically connected to relay 304. Thus, when disc 232 is rotated so as to energize motor 306 as previously described, rotation of shaft 310 will continue until finger 356 reaches the segment on band 352 corresponding to the segment on band 354 in contact with finger 276. When this point is reached, relay 304 is activated to de-energize relays 300 and 302, thereby halting the rotation of motor 306, a series connection being made back to relay 304, the cut off relay, to cut offf the rotation sequence when the positions of fingers 276 and 356 match with respect to corresponding segments on bands 354 and 352, respectively. Thus, shaft 310 is positioned along with shaft 222 to the direction selected by the rotation of turn dial 212. However, shaft 310 and motor 306 preferably follow at a slower rate of speed corresponding to the simulated turn rate of an aircraft target, the turn rate of shaft 310 being determined by the electrical characteristics of motor 306 which are selected to correspond to the turn rate of an aircraft, this turn rate being preferably either 3° or 6° per second; 3° per second being the normal aircraft turn rate and 6° per second being the emergency measure turn rate for an aircraft. In this manner a more realistic simulation is provided.

An impedance 357 is preferably connected in series with the power supply 307 for motor 306 so as to regulate the voltage supplied to motor 306 and as a result the turn rate provided by motor 306 to 3° per second when switch 215 is open. When switch 215, which is connected in parallel with impedance 357 is closed, impedance 357 is bypassed and the resultant increased voltage supplied to motor 306 causes motor 306 to operate at the 6° per second emergency turn rate.

As shown and preferred in FIG. 10, right turn disc 330 which is mounted on shaft 310 of follower 220 preferably includes conductive circumferential bands or segments 360, 362–363, 364–365–366–367, and 368–369–370–371 in four radial positions corresponding to the location of conductor fingers 314, 316, 318 and 320, respectively, and are respectively in contact therewith as shown in FIG. 10. The innermost band 360 which is in contact with finger 314 is the speed reversal band. Band segments 362 and 363 which are contacted by finger 316, illustratively shown as contacting segment 362, are termed the turn reversal segments and occupy the next outer radial band. Conductive band segments 362, 365, 366 and 367 which are contacted by finger 318 are termed the speed resistive segments and occupy the third radial band at the position corresponding to the location of finger 318, illustratively shown as contacting segment 364. Finally, conductive band segments 368, 369, 370 and 371 are the turn resistive segments and occupy the outermost radial band corresponding to the position of contact finger 320 illustratively shown contacting segment 371. Preferably, all of the conductive band segments 360, 362, 363, 364, 365, 366, 367, 368, 369, 370 and 371 are provided with a source of potential (not shown), the segments 364–365–366–367, and 368–369–370–371 in the two outermost bands acting as rheostats and being resistive in nature as opposed to purely conductive, receive their sources of potential at opposite ends of each pair of radially opposed segments, as will be described in greater detail hereinafter.

Contact finger 314 is electrically connected to a conventional speed control relay 374, segment 360 delivering current through contact finger 314 to activate this speed relay 374. Contact finger 316 is electrically connected to a conventional turn control relay 376. Each of the segments 362 and 363 when contacted by finger 316 delivers current through finger 316 to activate turn control relay 376. Segments 364, 365, 366 and 367 in the third radial band and corresponding segments 368, 369, 370 and 371 in the fourth radial band deliver current through contact fingers 318 and 320, respectively, through relays 374 and 376, respectively. Relays 374 and 376 control the application of power from a conventional pulse power source 378 to speed motor 106 and turn motor 102, respectively. The associated pulse repitition rate and pulse width of source 378 are preferably that of the desired radar sweep interval, for example a pulse duration or width of 1 second every 10 seconds to simulate a real time radar sweep, thus being capable of activating motors 102 and 106 during the on interval of the power source, that is when a pulse is provided, Thus, when relays 374 and/or 376 are activated, power from source 378 is supplied to motors 106 and/or 102, respectively, during the duration of the pulse.

The segment pairs and the two bands which are aligned radially 364–368, 365–369, 366–370 and 367–371 are fed their respective potential or EMF at opposite ends thereof so that as the respective contact fingers 318 and 320 sweep them together, current through one segment of the pair decreases as current through the other segment of the pair increases; for example current through segment 364 decreasing as current through segment 368 increases. These paired segments, as was previously mentioned, are resistive segments and act as a rheostat. Thus, as the current provided from one segment increases the rate of the associated motor driven thereby will increase and, correspondingly, as the current provided from the other segment of the "pair" decreases the rate at which the corresponding motor controlled thereby is driven will decrease. In this manner, as turn motor 102 turns at a faster rate due to increased current thereto, the turn rate of speed motor 106 will decrease due to correspondingly decreased current thereto from the rheostat arrangement of the conductive band segments, the fourth or outermost radial segments controlling the operation of turn motor 102 together with the turn reversal segments 362 and 363 on the second radial band, and the third band of radial segments 364–365–366–367 controlling the operation of speed motor 106 together with the innermost speed reversal segment 360. Of course, the opposite effect will occur as the speed motor 106 turns at a faster rate due to the increased current thereto, the turn rate of turn motor 102 will decrease due to corresponding decreased current thereto. In this manner, the vectors associated with the turn rate motor 102 and the speed motor 106 in the direction of movement of the target do not tend to increase the forward speed of the target as the target makes a turn thereby providing a compensating factor and a much more realistic representation of an actual live target in a turn condition.

As was previously mentioned, this relationship is true of all radial pairs of segments in the two outermost bands on disc 330. Preferably, left turn disc 332 is identical in structure and configuration with right turn disc 330 for effecting the operation of relays 374 and 376 and rotors 102 and 106 during a left hand turn and will not be described in greater detail hereinafter, the only difference being the direction of movement of the disc and the direction of rotation of the turn motor.

If desired, a switch may be added to the control circuitry in order to cut the power supplied to rotors 102 and 106 so as to freeze the motion of the target in a given position for instructional purposes. This switch has been omitted for purposes of clarity.

As was also previously mentioned with reference to FIG. 7, the relay control network preferably includes means for enabling alternative drive thereof by a conventional preprogrammed tape inserted through an opening 216 in the panel, the tape in this instance energizing a conventional motor 380 which, in turn, energizes gear 236 to rotate shaft 222 to effect automatic operation of the direction control 218, the motor 380 preferably having a free running clutch so as not to create any drag on the system when the director 218 is operated manually and gear 236 is not engagedly driven by motor 380. If desired, means can be provided for uncoupling gear 236 from the motor 380 drive when the director 218 is operated manually. The cooperation between the tape and motor 380 to effect automatic operation is conventional and will not be described in greater detail hereinafter.

Utilization of an automatic control enables all targets to fly preselected routes or airways without further manual guidance. In such instance the tape may be furnished with information to return all targets to preselected zero positions in preparation for a new problem or a master tape could be utilized to preprogram problems thereby gaining maximum effect of precalculated situations.

Summarizing the operation of the air traffic controller training aid of the present invention, the projector assemblies 64 and 66 are preferably set in the zero position at the start with all targets stationary. As was previously mentioned, a control panel is provided for each projector and, thus, for each target. The speed is set for each target via dial 202, the altitude is set on dial 204, the descent-level-climb is selected on dial 206, the desired transponder code is selected on switches 208 and 210, and turn dial 212 is positioned for a proper initial heading. The turn dial 212 which determines the direction of movement of the target is rotated in a desired direction which, in turn, rotates shaft 222 in controller 218. This causes the activation of relay 300 and, depending on the direction of rotation, the activation of relay 302 so as to effect the rotation of motor 306 causing follower shaft 310 to rotate at a slower rate, representing the rate of turn of an aircraft. As previously explained, the direction of rotation of shaft 310 causes relative movement of either right turn disc 330 for clockwise rotation or left hand disc 332 for counterclockwise rotation with respect to disc 312. The contact fingers (314, 316, 318 and 320 for disc 330, and 322, 324, 326 and 328 for disc 332) starting from an initial neutral position along an imaginary line 400 (FIG. 10) make contact with the various conductive band segments 360 through 371 inclusive on either disc 330 or 332, respectively, depending on the direction of rotation, causing the operation of relays 374 and 376 and, hence, motors 106 and 102 in a manner previously described which, in turn, causes the movement of the corresponding projector, turn motor 102 rotating the projector about axis 96 and speed motor 106 rotating the projector about the speed axis 104 which is along the interior of the frame 94, the projector moving along at least two axes, the turn axis provided by turn motor 102 and the speed axis provided by speed motor 106 in conjunction with the appropriate gearing of the projector 86 to the frame 94 and the rotation of the projector assembly about the axis provided by the rotation of motor 92 and shaft 90.

While relay 374 is inactivated it preferably still supplies power to speed motor 106 so that the target is continually moving along a predetermined forward path. At this time, turn motor 102 is preferably not operating. It is only when the turn dial 212 (or gear 236 when driven by motor 380 in response to a tape input) is rotated more than 90° that there is a change in direction and rotation of speed motor 106. At this point, relay 374 is activated to the on position and thus, relay 374 is appropriately termed the speed reverse relay. When it is off it supplies power in the forward direction and when it is on it supplies power in the reverse direction.

By utilizing the present invention the relatively simple and efficient life-like simulation of live air traffic conditions having a plurality of individually controllable targets and associated parameters thereof can be provided.

It is to be understood that the above described embodiment of the invention is merely illustrative of the principles thereof and that numerous modifications and embodiments of the invention may be derived within the spirit and scope thereof, such as if it is desired to simulate a computer controlled presentation for the target projector, then drive control assembly 72 may be omitted and synchro 162 driven directly by another conventional synchro which is operatively connected to follower motor 306 to match the rotation thereof. In such a presentation, the target image would preferably be computer synbology such as an arrowhead pointing in the direction of flight.

What is claimed is:

1. An aircraft traffic control training aid apparatus for simulating a dynamic aircraft traffic radar presentation containing a plurality of simulated dynamic aircraft targets comprising: a screen for displaying said simulated presentation thereon; a first projection means for projecting one of said plurality of simulated aircraft targets on said screen, each of said plurality of simulated aircraft targets having a plurality of associated simulated variable parameters including a simulated trajectory across said screen and a simulated speed of movement across said screen, each of said targets having an initial simulated speed and trajectory, said first projection means being movable about a plurality of axes relative to said screen and comprising first means for dynamically moving said first projection means about at least one of said plurality of axes for dynamically varying at least one of said plurality of associated simulated parameters of said one simulated aircraft target in said plural target presentation on said screen, said first moving means comprising first drive means for driving said first projection means about said one axis and first electromagnetic means for controlling the operation of said first drive means in accordance with an assigned simulation condition, a second projection means for independently projecting another of said plurality of simulated aircraft targets on said screen substantially simultaneously with the projection of said one simulated target by said first projection means, said second projection means being independently movable about a plurality of axes relative to said screen and comprising second independent means for independently dynamically moving said second projection means about at least one of said plurality of axes for independently dynamically moving said second projection means about at least one of said plurality of axes for independently dynamically varying at least one of said plurality of associated simulated parameters of said other simulated aircraft target in said plural target presentaion on said screen, said second independent moving means comprising second drive means for independently driving said second projection means about said one axis and second electromagnetic means for independently controlling the operation of said second drive means in accordance with an independent assigned simulation condition; and third projection means for displaying a radar simulation of weather condition in said screen substantially simultaneously with the projection of said aircraft targets by said first and second projection means, said third projection means including means for altering said weather presentation on said screen, said targets and said weather projection being superimposed in said presentation; whereby a plurality of individually controllable dynamic aircraft targets are provided in said presentation.

2. An apparatus in accordance with claim 1 wherein said alteration means comprises means for obscuring at least a portion of said weather presentation on said screen for simulating a radar moving traffic indicator condition.

3. An apparatus in accordance with claim 1 further comprising fourth projection means for displaying a radar simulation of mapping on said screen substantially simultaneously with the projection of said aircraft targets by said first and second projection means, said mapping, weather and target projections being superimposed in said presentation.

4. An aircraft traffic control training aid apparatus for simulating a dynamic aircraft traffic radar presentation containing a plurality of simulated dynamic aircraft targets comprising; a screen for displaying said simulated presentation thereon; a first projection means for projecting one of said plurality of simulated aircraft targets on said screen, each of said plurality of simulated aircraft targets having a plurality of associated simulated variable parameters including a simulated trajectory across said screen and a simulated speed of movement across said screen, each of said targets having an initial simulated speed and trajectory, said first projection means being movable about a plurality of axes relative to said screen and comprising first means for dynamically moving said first projection means about at least one of said plurality of axes for dynamically varying at least one of said plurality of associated simulated parameters of said one simulated aircraft target in said plural target presentation on said screen, said first moving means comprising first drive means for driving said first projection means about said one axis and first electromagnetic means for controlling the operation of said first drive means in accordance with an assigned simulation condition and a second projection means for independently projecting another of said plurality of simulated aircraft targets on said screen substantially simultaneously with the projection of said one simulated target by said first projection means, said second projection means being independently movable about a plurality of axes relative to said screen and comprising second independent means for independently dynamically moving said second projection means about at least one of said plurality of axes for independently dynamically varying at least one of said plurality of associated simulated parameters of said other simulated aircraft target in said plural target presentation on said screen, said second independent moving means comprising second drive means for independently driving said second projection means about said one axis and second electomagnetic means for independently controlling the operation of said second drive means in accordance with an independent assigned simulation condition, said first moving means further comprising third drive means for driving said first projection means about another of said axes and third electromagnetic means for controlling the operation of said third drive means in accordance with said assigned condition, said first and third drive means each having an associating driving rate, and means inversely relating said first and third drive means driving rates for simultaneously varying both of said rates inversely, said assigned condition being a change in trajectory from said initial trajectory for said one target comprising said two axis movement whereby said speed parameter associated with said one target is substantially constant throughout said trajectory change; whereby a plurality of individually controllable dynamic aircraft targets are provided in said presentation.

5. An aircraft traffic control training aid apparatus for simulating a dynamic aircraft traffic radar presentation containing a plurality of simulated dynamic aircraft targets comprising: a screen for displaying said simulated presentation thereon; a first projection means for projecting one of said plurality of simulated aircraft targets on said screen, each of plurality of simulated aircraft targets having a plurality of associated simulated variable parameters including a simulated trajectory across said screen and a simulated speed of movement across said screen, each of said targets having an initial simulated speed and trajectory, said first projection means being movable about a plurality of axes relative to said screen and comprising first means for dynamically moving said first projection means about at least one of said plurality of axes for dynamically varying at least one of said plurality of associated simulated parameters of said one simulated aircraft target in said plural target presentation on said screen, said first moving means comprising first drive means for driving said first projection means about said one axis and first electromagnetic means for controlling the operation of said first drive means in accordance with an assigned simulation condition and a second projection means for independently projecting another of said plurality of simulated aircraft targets on said screen substantially simultaneously with the projection of said one simulated target by said first projection means, said second projection means being independently movable about a plurality of axes relative to said screen and comprising second independent means for independently dynamically moving said second projection means about at least one of said plurality of axes for independently dynamically varying at least one of said plurality of associated simulated parameters of said other simulated aircraft target in said plural target presentation on said screen, said second independent moving means comprising second drive means for independently driving said second projection means about said one axis and second electromagnetic means for independently controlling the operation of said second drive means in accordance with an independent assigned simulation condition; said first projection means further comprising a target image plate for projecting said one target, said target image plate comprising a transponder identification code simulation means for projecting said transponder identification code simulation, said transponder identification code simulation comprising said one target image in said presentation on said screen; whereby a plurality of individually controllable dynamic aircraft targets are provided in said presentation.

6. An apparatus in accordance with claim 5 wherein said transponder identification code simulation means comprises means for independently varying said transponder identification code simulation.

7. An apparatus in accordance with claim 6 wherein said transponder identification code simulation means comprises a second plate mounted in juxtaposition with said target image plate, said target image plate and said second plate having communicating apertures therein, said code simulation means further comprising shutter means removably interposable in said second plate aperture for independently varying the configuration of said second plate aperture whereby said transponder identification code is varied.

8. An apparatus in accordance with claim 6 wherein said transponder identification code simulation means comprises a second plate mounted in juxtaposition with said target image plate, said target image plate and said second plate having communicating apertures therein, said second plate being rotatably mounted on said target image plate for independent rotation therefrom, said transponder identification code having a predetermined orientation with respect to an origin of radar sweep of said display and said apparatus further includes means operatively connected to said second plate for rotating said second plate and dynamically varying the orientation of said transponder identification code throughout said radar sweep across said screen so as to maintain said predetermined orientation with respect to said origin.

9. An apparatus in accordance with claim 5 wherein said first projection means comprises an aircraft altitude information plate for providing an altitude parameter for said one target and an aircraft identification plate for providing an identification parameter for said one target, said plates being concentrically mounted on a common shaft in juxtaposition with said target image plate, and being adapted for projecting said altitude information parameter and said identification information parameter adjacent to each other and adjacent to said transponder identification code simulation in said presentation on said screen.

10. An apparatus in accordance with claim 9 wherein said first projection means further comprises means for independently dynamically varying said aircraft altitude information parameter portion of said presentation.

11. An aircraft traffic control training aid apparatus for simulating a dynamic aircraft traffic radar presentation containing a plurality of simulated dynamic aircraft targets comprising: a screen for displaying said simulated presentation thereon; a first projection means for projecting one of said plurality of simulated aircraft targets on said screen each of said plurality of simulated aircraft targets having a plurality of associated simulated variable parameters including a simulated trajectory across said screen and a simulated speed of movement across said screen, each of said targets having an initial simulated speed and trajectory, said first projection means being movable about a plurality of axes relative to said screen and comprising first means for dynamically moving said first projection means about at least one of said plurality of axes for dynamically varying at least one of said plurality of associated simulated parameters of said one simulated aircraft target in said plural target presentation on said screen, said first moving means comprising first drive means for driving said first projection means about said one axis and first electromagnetic means for controlling the operation of said first drive means in accordance with an assigned simulation condition and a second projection means for independently projecting another of said plurality of simulated aircraft targets on said screen substantially simultaneously with the projection of said one simulated target by said first projection means, said second projection means being independently movable about a plurality of axes relative to said screen and comprising second independent means for independently dynamically moving said second projection means about at least one of said plurality of axes for independently dynamically varying at least one of said plurality of associated simulated parameters of said other simulated aircraft target in said plural target presentation on said screen, said second independent moving means comprising second drive means for independently driving said second projection means about said one axis and second electromagnetic means for independently controlling the operation of said second drive means in accordance with an independent assigned simulation condition; , said first projection means further comprising a first frame member and a second frame member, said first frame member being rotatably mounted on said second frame member, a pair of telescoping lens barrels mounted one within the other for focusing an image protected through said lens barrels to said screen, said projected image comprising said one target, said lens barrels being threadedly connected together, one of said lens barrels being in cooperative engagement with said second frame member, said first driving means being operatively connected to said second frame member for rotating said second frame member about said one axis whereby as said second frame member is rotated said one lens barrel is telescoped with respect to said other barrel to maintain the focus of said projected image on said screen throughout said rotation; whereby a plurality of individually controllable dynamic aircraft targets are provided in said presentation.

12. An aircraft traffic control training aid apparatus for simulating a dynamic aircraft traffic radar presentation containing a plurality of simulated dynamic aircraft targets comprising: a screen for displaying said simulated presentation thereon; a first projection means for projecting one of said plurality of simulated aircraft targets on said screen each of said plurality of simulated aircraft targets having a plurality of associated simulated variable parameters including a simulated trajectory across said screen and a simulated speed of movement across said screen, each of said targets having an initial simulated speed and trajectory, said first projection means being movable about a plurality of axes relative to said screen and comprising first means for dynamically moving said first projection means about at least one of said plurality of axes for dynamically varying at least one of said plurality of associated simulated parameters of said one simulated aircraft target in said plural target presentation on said screen, said first moving means comprising first drive means for driving said first projection means about said one axis and first electromagnetic means for controlling the operation of said first drive means in accordance with an assigned simulation condition and a second projection means for independently projecting another of said plurality of simulated aircraft targets on said screen substantially simultaneously with the projection of said one simulated target by said first projection means, said second projection means being independently movable about a plurality of axes relative to said screen and comprising second independent means for independently dynamically moving said second projection means about at least one of said plurality of axes for independently dynamically varying at least one of said plurality of associated simulated parameters of said other simulated aircraft target in said plural target presentation on said screen, said second independent moving means comprising second drive means for independently driving said second projection means about said one axis and second electromagnetic means for independently controlling the operation of said second drive means in accordance with an independent assigned simulation condition; said first electromagnetic means comprising a pair of sectored conductive plate members operatively connected together, each of said plate members having a rotatably mounted indicator means thereon, each of said sectors being equivalent to a predetermined degree of trajectory variation for said one target, each of said indicators being conductively connectable to only one sector at a time, means for synchronizing said plate member indicator means, one of said indicators being settable to a preselected conductive position indicative of a predetermined degree of trajectory variation, the other of said indicators being rotatably driven by said synchronizing means to a corresponding conductive position, said second indication means being operatively conductively connected to a relay control means for controlling the condition thereof, and said relay control means being operatively conductively connected to said first drive means for controlling the operation thereof to drive said first projection means about said one axis in response to the rotation of said second indicator means to said corresponding position whereby the trajectory of said one target may be varied in accordance with the setting of said one indicator; whereby a plurality of individually controllable dynamic aircraft targets are provided in said presentation.

* * * * *